United States Patent
Kunz et al.

(10) Patent No.: US 12,555,800 B2
(45) Date of Patent: Feb. 17, 2026

(54) BIPOLAR PLATE WITH STIFFENING STRUCTURES

(71) Applicant: Reinz-Dichtungs-GmbH, Neu-Ulm (DE)

(72) Inventors: Claudia Kunz, Ulm (DE); Rainer Glueck, Tomerdingen (DE); Werner Buntz, Mühlhausen (DE); Sebastian Schaefer, Heroldstatt (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 1125 days.

(21) Appl. No.: 17/452,369

(22) Filed: Oct. 26, 2021

(65) Prior Publication Data
US 2022/0131162 A1   Apr. 28, 2022

(30) Foreign Application Priority Data
Oct. 27, 2020  (DE) .................. 20 2020 106 144.5

(51) Int. Cl.
*H01M 8/0271*  (2016.01)
*H01M 4/86*  (2006.01)

(52) U.S. Cl.
CPC ........... *H01M 8/0271* (2013.01); *H01M 4/86* (2013.01); *H01M 2004/8694* (2013.01)

(58) Field of Classification Search
CPC . H01M 8/0271; H01M 8/0202; H01M 8/0247
See application file for complete search history.

(56) References Cited

U.S. PATENT DOCUMENTS

| 2021/0075050 A1* | 3/2021 | Stoehr | H01M 8/0297 |
| 2021/0202963 A1* | 7/2021 | Wenzel | H01M 8/0271 |

FOREIGN PATENT DOCUMENTS

| CN | 208208882 U | * | 12/2018 | |
| CN | 111247678 A | | 6/2020 | |
| DE | 102015118007 A1 | | 5/2016 | |
| DE | 202018104628 U1 | | 11/2019 | |
| EP | 2065958 A1 | | 6/2009 | |
| WO | WO-2019121947 A1 | * | 6/2019 | C25B 9/00 |

OTHER PUBLICATIONS

China National Intellectual Property Administration, Office Action and Search Report Issued in Application No. 202111256290.2, Jan. 15, 2023, 13 pages.

* cited by examiner

*Primary Examiner* — Sean P Cullen
*Assistant Examiner* — Heng M. Chan
(74) *Attorney, Agent, or Firm* — McCoy Russell LLP

(57) ABSTRACT

A bipolar plate for an electrochemical system. The bipolar plate comprising a first individual plate and a second individual plate which are joined together. Each individual plate comprising: an electrochemically active region, an outer edge, and a perimeter sealing element. The outer edge region spans between the edge of the perimeter sealing element and the outer edge. Some embodiments of the outer edges protrude out of a plate plane defined by the bipolar plate. A plurality of stiffening structures stiffening the outer edge region of the bipolar plate.

20 Claims, 7 Drawing Sheets

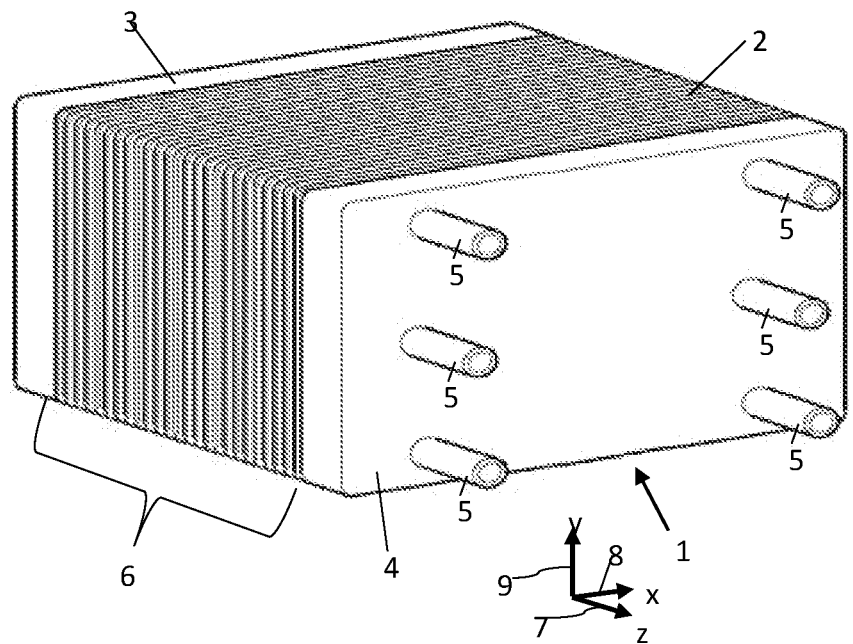
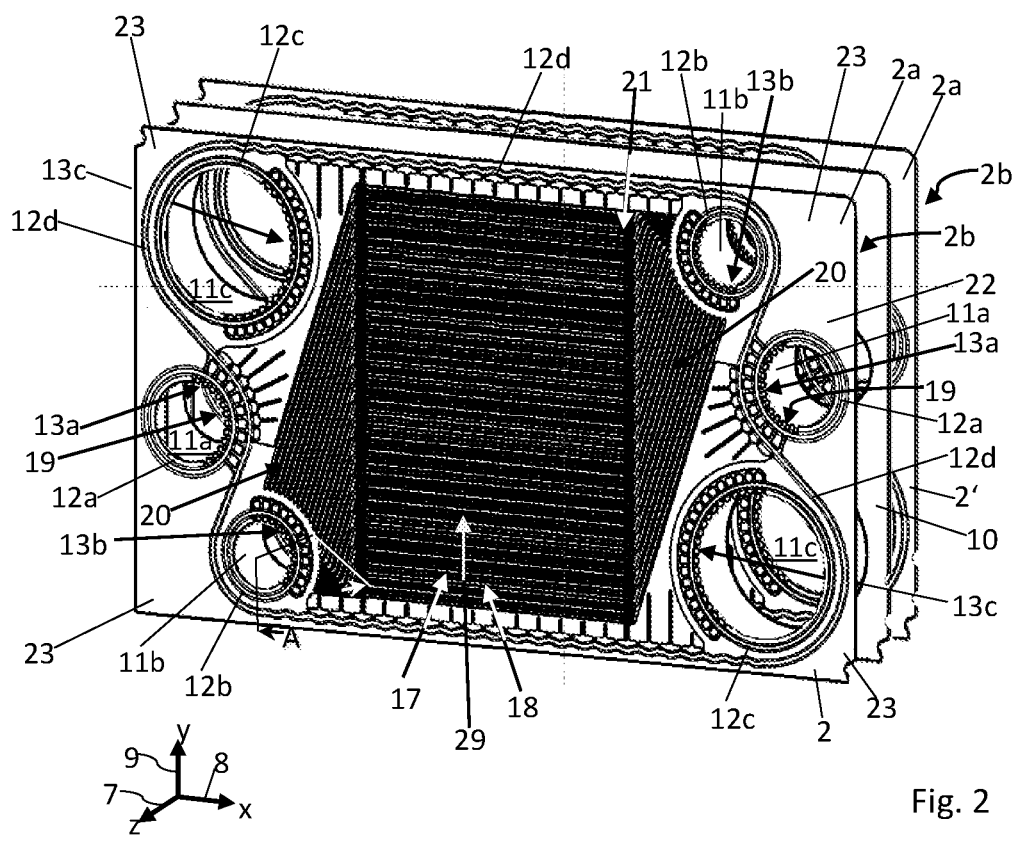
Fig. 1
Fig. 2

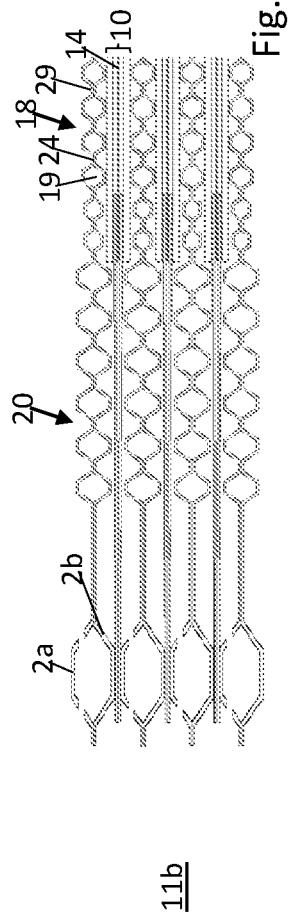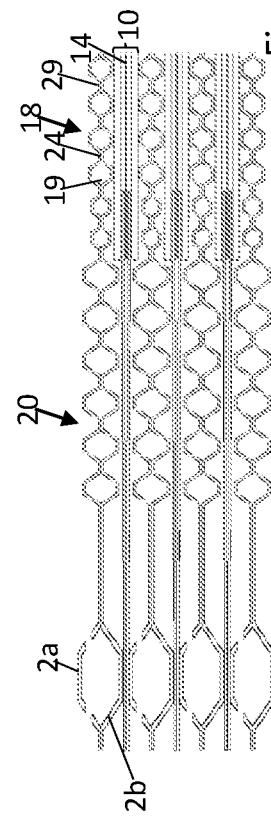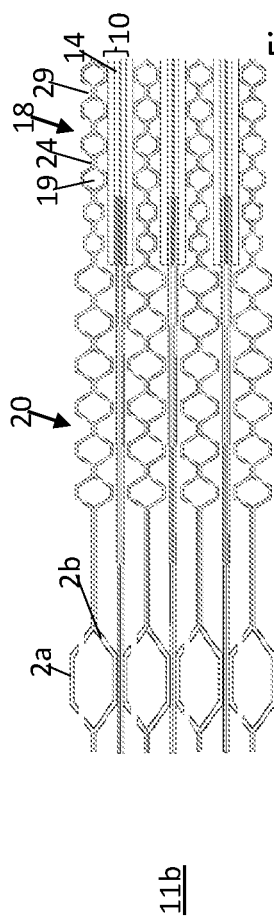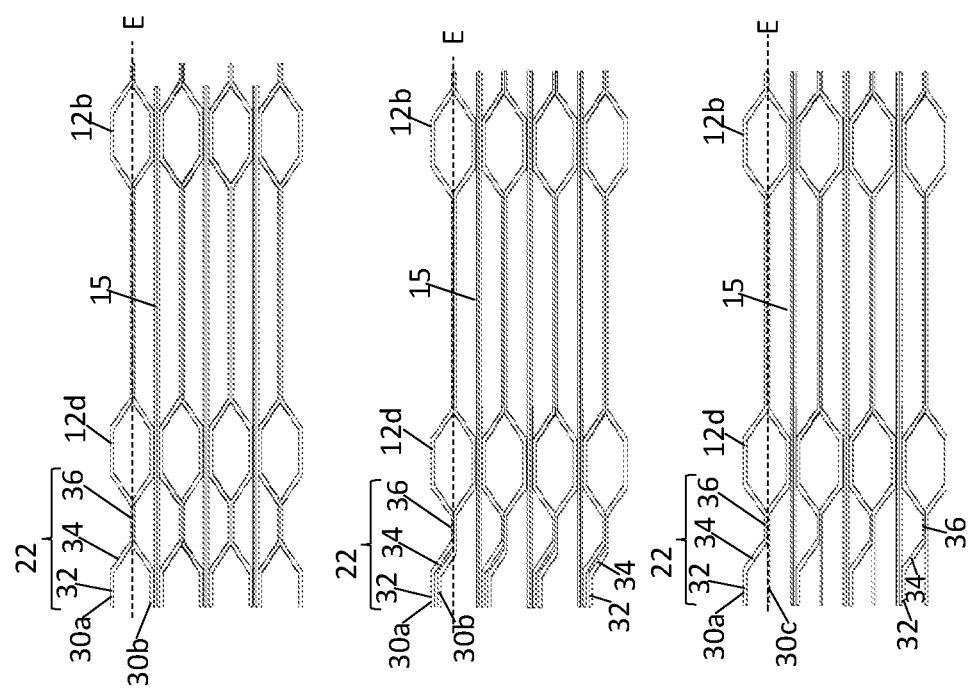

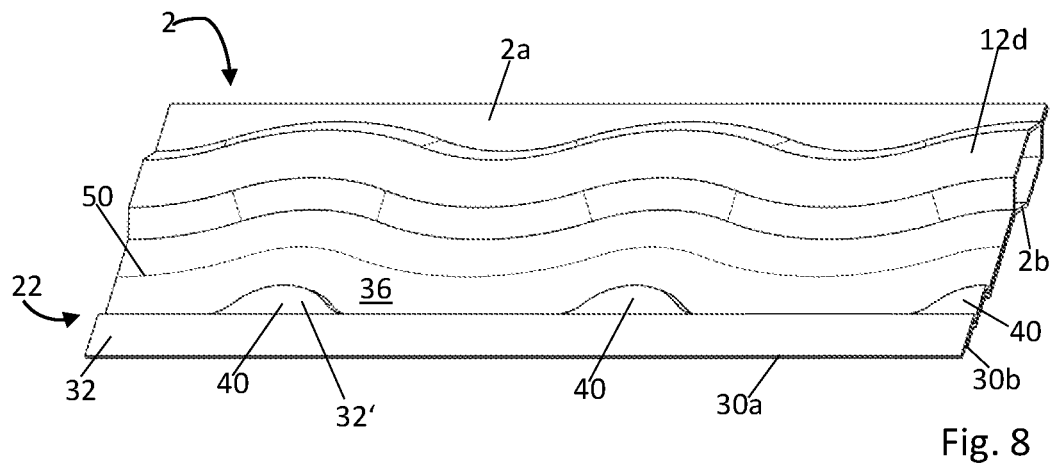
Fig. 8
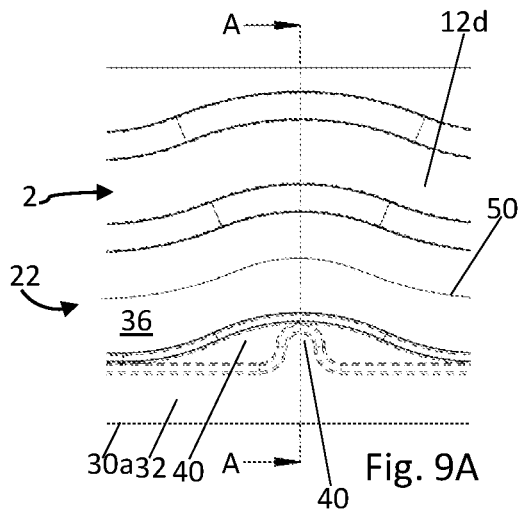
Fig. 9A
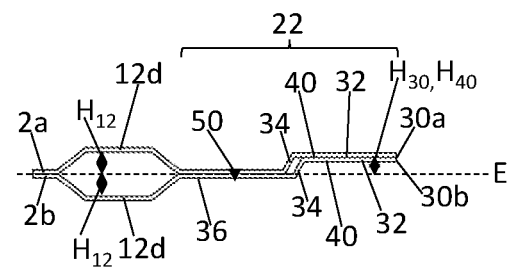
Fig. 9B (A-A)
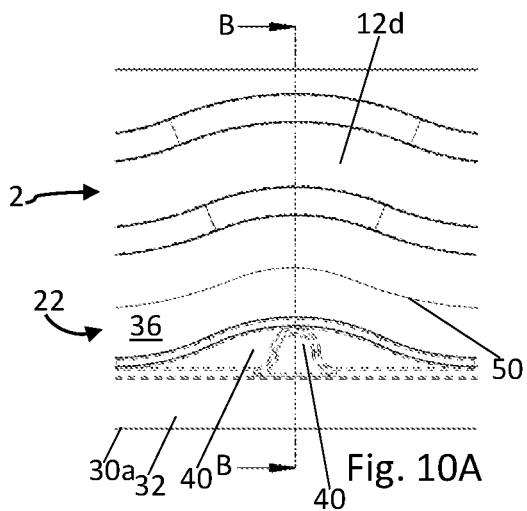
Fig. 10A
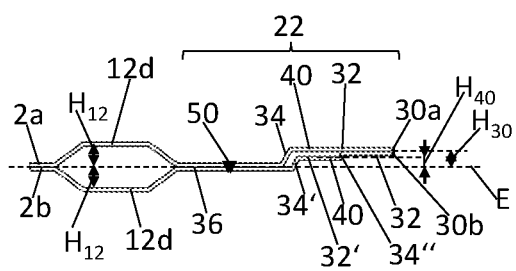
Fig. 10B (B-B)

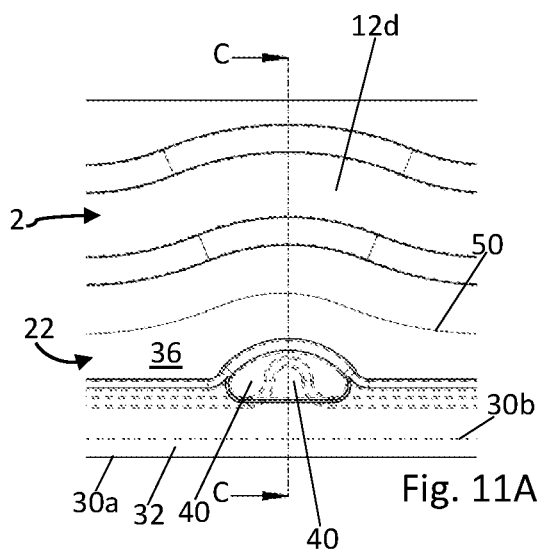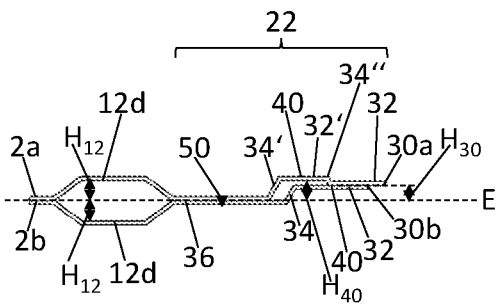
Fig. 11A
Fig. 11B (C-C)
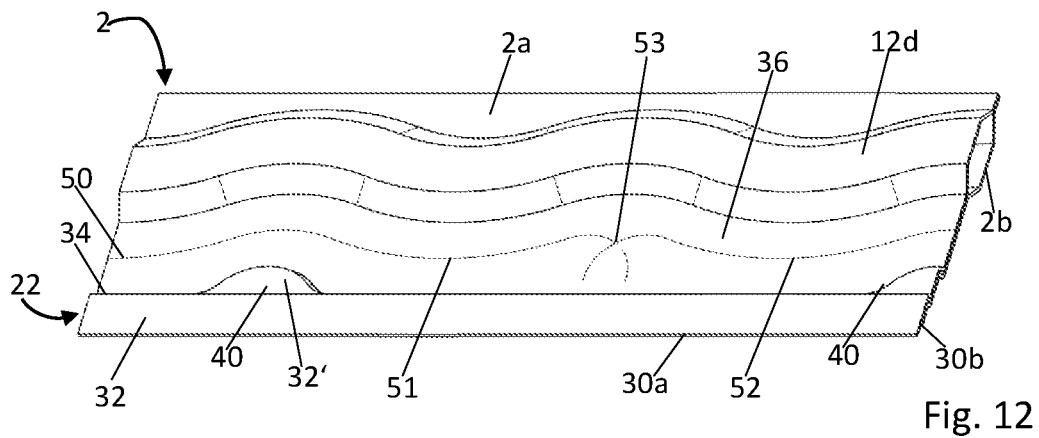
Fig. 12
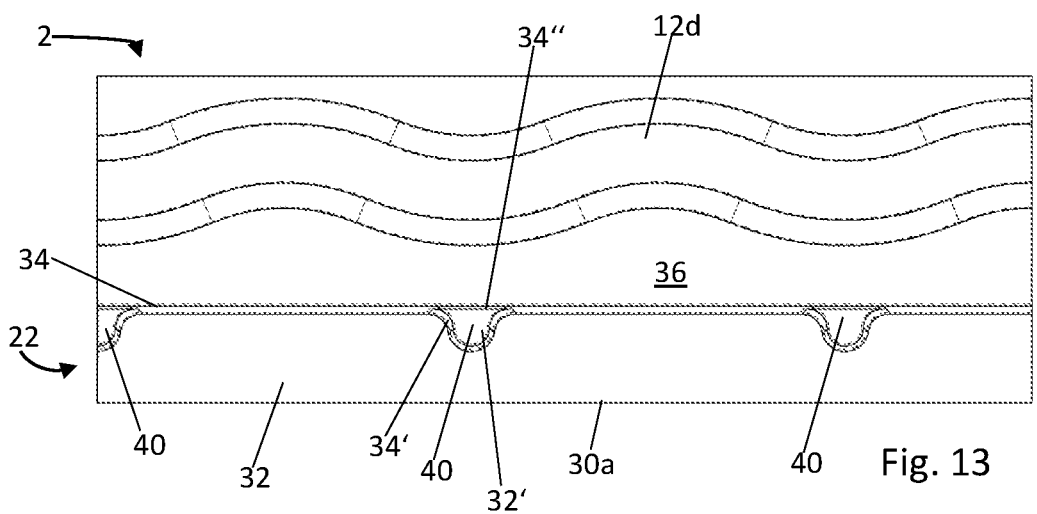
Fig. 13

BIPOLAR PLATE WITH STIFFENING STRUCTURES

CROSS-REFERENCE TO RELATED APPLICATION

The present application claims priority to German Utility Model Application No. 20 2020 106 144.5, entitled "BIPOLAR PLATE WITH STIFFENING STRUCTURES", filed on Oct. 27, 2020. The entire contents of the above-listed application is hereby incorporated by reference for all purposes.

TECHNICAL FIELD

The present disclosure relates to a bipolar plate for an electrochemical system and also to an electrochemical system comprising a multiplicity of such bipolar plates. The electrochemical system may be for example a fuel cell system, an electrochemical compressor, a redox flow battery or an electrolyser.

BACKGROUND AND SUMMARY

Known electrochemical systems normally comprise a stack of electrochemical cells which are separated from each other in each case by bipolar plates. Such bipolar plates may serve e.g. for indirect electrical contacting of the electrodes of the individual electrochemical cells (e.g. fuel cells) and/or for electrical connection of adjacent cells (series connection of the cells). Typically, the bipolar plates are formed from two joined individual plates. The individual plates of the bipolar plate may be joined by a material-formed bond, e.g. by one or more welded joints, for instance by one or more laser-welded joints.

The bipolar plates or the individual plates may each have or form structures which are embodied e.g. for supplying the electrochemical cells delimited by adjacent bipolar plates with one or more medium/media and/or for transporting away reaction products. The media may be fuels (e.g. hydrogen or methanol) or reaction gases (e.g. air or oxygen). Further, the bipolar plates or the individual plates may have structures for guiding a cooling medium through the bipolar plate, such as through a cavity enclosed by the individual plates of the bipolar plate. Further, the bipolar plates may be embodied to pass on the waste heat produced during the conversion of electrical or chemical energy in the electrochemical cell and also to seal off the different media channels or cooling channels from each other and/or from the outside.

Further, the bipolar plates usually each have a plurality of through-openings. Through the through-openings, the media and/or the reaction products can be conducted to the electrochemical cells which are delimited by adjacent bipolar plates of the stack, or into the cavity formed by the individual plates of the bipolar plate, or discharged from the cells or from the cavity. The electrochemical cells furthermore each typically comprise one or more membrane electrode units (membrane electrode assemblies or MEAs). The MEAs may have one or more gas diffusion layers, which usually are oriented towards the bipolar plates and are embodied e.g. as a nonwoven metal or carbon fabric.

The sealing between the bipolar plates and the membrane electrode assembly usually takes place outside the electrochemically active region and usually comprises both at least one port seal arranged around the through-opening and an outer seal (perimeter sealing element), both of which may be embodied as bead arrangements.

The bipolar plates are usually formed from thin metal sheet, the metal sheet of the individual plates often having a thickness of between about 60 µm and 150 µm. Due to their low sheet thickness, bipolar plates are thus relatively fragile and flexible items. It has been shown in practice that an outer edge of the bipolar plate which laterally delimits the bipolar plate can be deformed by minor mechanical stresses. As a result, in different stages of the production process, during transport and/or handling of the bipolar plates undesirable deformation of the bipolar plates may occur, which in the worst case leads to a high level of rejects.

The object of the present disclosure is thus to develop a more robust bipolar plate which at least partially solves the aforesaid problems. Furthermore, the object of the present disclosure is to develop an electrochemical system with a multiplicity of such bipolar plates.

These objects are achieved by the subject-matter of the independent claims.

According to one aspect of the present disclosure, a bipolar plate for an electrochemical system is proposed. The bipolar plate comprises a first individual plate and a second individual plate which are joined together, each individual plate having:
  an electrochemically active region,
  an outer edge which laterally delimits the respective individual plate,
  a perimeter sealing element, surrounding the electrochemically active region and running at least in regions along the outer edge, for sealing off the electrochemically active region.

An outer edge region is spanned between the edge of the perimeter sealing element facing the outer edge of the bipolar plate and the outer edge. If one of the outer edges of an individual plate in an orthogonal projection into the contact plane of the individual plates, for example into the plate plane of the bipolar plate, protrudes farther outwards than the other, the outer edge region extends up to that outer edge which protrudes farther. If the perimeter sealing element is embodied as a bead, the edge of the perimeter sealing element can be formed by that end of the bead flank which points to the outer edge, in the case of an arcuately dished bead as the transition of the arc into a flat plate portion running parallel to the plate plane.

In at least one of the individual plates, the outer edge at least in regions protrudes out of a plate plane defined by the bipolar plate. At least one of the individual plates has a plurality of stiffening structures, for instance at least three stiffening structures, in order to stiffen the outer edge region of the bipolar plate.

The outer edge of the individual plate in this case is to be understood as the encircling face which surrounds the respective individual plate towards the outside. Because of the usually low height of the individual plates relative to their extent in the face, the outer edge can therefore also be considered as a line, disregarding the thickness of the individual plate.

The individual plates may often each have a thickness of at least 60 µm and/or at most 150 µm. In particular, the individual plates can each comprise a sheet made of stainless steel. When considering planes below, the respective plate thickness (or sheet thickness) of the individual plates has been disregarded or not taken into account. In an exemplary manner, in this case both individual plates lie in the plate plane of the bipolar plate. If alternatively, the plate thickness of the respective individual plate is indeed to be taken into account, a plate plane of the respective individual plate may also be meant below instead of the plate plane of the bipolar plate. Thus, in this case in at least one of the individual plates, the outer edge protrudes at least in regions out of a plate plane defined by the respective individual plate.

Both the outer edge protruding out of the plate plane and the stiffening structures may contribute to reinforcing an outer edge region of the bipolar plate. As a result, the bipolar plate becomes more robust, such as in its edge region, which may lead for example to reduced rejects during the production, transport and/or handling of the bipolar plate.

Advantageously, the outer edge protruding out of the plate plane can likewise be utilized in order to place and/or fix the plate in a production tool such as a joining tool or in a test tool, or alternatively for positioning the bipolar plate in a stacking device for stacking the cell stack of the electrochemical system.

Optionally, the stiffening structures of the one or both individual plate(s) are arranged between the outer edge and the perimeter sealing element of the respective individual plate. Provision may be made for the individual plates, in a region between the outer edge and the perimeter sealing element, for example in the outer edge region, at least in portions to lie flat against one another and to contact one another. The individual plates may be joined in the outer edge region by bonding, for example by means of at least one welded joint, laser-beam welded joint, soldered joint and/or adhesive-based connection. The outer edge region may have a contact region in which the individual plates at least in portions lie flat against one another and contact one another. Typically, the stiffening structures are arranged between the contact region and the outer edge and/or adjoin the contact region.

In some embodiments, the outer edges of the individual plates are spaced apart from one another. Optionally, the outer edges of the individual plates gape or spread apart from each other. This embodiment may thus be helpful for the above-mentioned placing and/or fixing of the bipolar plate in a device.

In some embodiments, the outer edges of the individual plates are offset in the same direction with respect to the plate plane of the bipolar plate. In the outer edge region, they may in this case for example adjoin one another. Optionally, the individual plates adjoin each other in a form-fit manner in the outer edge region. With regard to the actual outer edges, it is possible for them in an orthogonal projection into a common plane parallel to the plate plane at least in portions to be congruent with each other. However, in such an orthogonal projection the outer edge of an individual plate at least in portions may be offset in relation to the other one, such as offset substantially parallel.

Provision may be made for the stiffening structures to be provided in merely one of the individual plates. Usually, however, both individual plates have the stiffening structures. Depending on the embodiment, the stiffening structures of the first plate may e.g. face away from or face the respective stiffening structures of the second plate. The latter may be used if the outer edges of the individual plates are offset in the same direction relative to the plate plane of the bipolar plate. They may point in different directions or in the same direction relative to the plate plane. Optionally, the stiffening structures which face away from each other have the same shape or a different shape. Optionally, if the stiffening structures point in the same direction relative to the plate plane of the bipolar plate or face each other, the stiffening structures of the first individual plate and the stiffening structures of the second individual plate are formed differently. Provision may be made for the individual plates in the region of the outer edge to at least partially engage in one another. Thus, individual or all the stiffening structures of the individual plates may engage in one another. In this case it is on the one hand possible for the individual plates to form a form-fit, but a clearance remaining between the individual plates in the x and/or y direction may also be used.

Often the stiffening structures are formed integrally with the respective individual plate, in particular integrally with the respective metallic individual plate. Thus, the stiffening structures may be embodied as embossed structures. The stiffening structures may be formed in the respective individual plate for example by means of hydroforming, embossing and/or deep drawing. Optionally, the stiffening structures comprise protrusions, which often point away from the outer edge and/or point in the direction of the perimeter sealing element. The stiffening structures may alternatively or additionally comprise indentations which usually are directed towards the outer edge and/or point away from the perimeter sealing element. Alternatively, the stiffening structures and a plate body of the respective individual plate may be separate elements which are joined together, e.g. by a form-fit, by a force-fit and/or by a material-formed bond.

Further, an outer edge region of the respective individual plate may be defined analogously to the outer edge region of the bipolar plate, for example as that region which is delimited by the outer edge. A cross-section of the outer edge region of at least one of the individual plates may at least in regions comprise a substantially flat plateau portion and a flank or dished portion which rises at an angle out of the plate plane, the flank or the dished portion typically merging into the plateau portion. The outer edge region may be formed in the respective individual plate for example by means of hydroforming, embossing and/or deep drawing. The plateau portion as a rule directly adjoins the outer edge. The outer edge region may further be delimited by the perimeter sealing element. The outer edge region may furthermore comprise the above-mentioned contact region. The contact region may extend from the flank/dished portion up to the perimeter sealing element.

The stiffening structures may be configured as a lengthening or shortening of the plateau portion perpendicularly to the outer edge. An extent of the plateau portion perpendicularly to the outer edge may thus depend on the presence of the stiffening structures and/or on the shape and size of the stiffening structures. The flank or dished portion may be at a different distance from the outer edge in the region of the stiffening structures than in an adjoining region without stiffening structures. If the stiffening structures are configured for example as protrusions, the flank/dished portion may be at a greater distance from the outer edge in the region of the protrusions. If the stiffening structures are configured as indentations, the flank/dished portion may be at a shorter distance from the outer edge there.

The stiffening structures may each have a height, measured from the plate plane of the bipolar plate (or the individual plate), which is less or greater than a height of the outer edge. The stiffening structures and the outer edge may also be of the same height. Often the height of the stiffening structures and/or the height of the outer edge are at most as great as a height of the perimeter sealing element: this applies for instance when the outer edges gape or spread apart, for example point in different directions relative to the plate plane of the bipolar plate. In the case of outer edges pointing in the same direction relative to the plate plane of the bipolar plate, the maximum height of the stiffening structures and/or the maximum height of the outer edge may at most be as great as an overall height of the perimeter sealing elements of the two individual plates of the bipolar plate. As a result, pressing of a bipolar plate incorporated in a plate stack of an electrochemical system is not, or is only insignificantly, influenced by the outer edge.

In some embodiments, the stiffening structures of the respective individual plate at least in portions are arranged periodically along the outer edge, so that adjacent stiffening structures of the respective individual plate in the portion in question are at the same distance from each other.

The perimeter sealing element of the respective individual plate may at least in portions have a periodic course. For example, an undulating course may be considered for this. The periodic or undulating course may for example have at least two wave periods with convex and concave portions which merge into one another at an inflection point. In some embodiments, the stiffening structures in each case face the concave portions of the perimeter sealing element. Likewise, it is however possible for at least one stiffening structure to face a convex portion of the perimeter sealing element and/or to be arranged in the region of an inflection point.

Usually, the individual plates each comprise at least one corner region, with at least one further stiffening structure being provided in the corner region of at least one individual plate, which structure may differ from the rest of the stiffening structures with regard to its shape and/or size. More space for stiffening structures may be present in the corner region than in the adjoining edge region. In this respect, the stiffening structures in the corner region may be larger in their two-dimensional extent in a plane parallel to the plate plane than the stiffening structures in the rest of the edge region.

In some embodiments, the first individual plate and the second individual plate have the same number of stiffening structures. Optionally, each stiffening structure of the first individual plate is associated in each case with one of the stiffening structures of the second individual plate. The stiffening structures of the two individual plates corresponding to each other can overlap in an orthogonal projection of the two individual plates in a common plane, for example at least in regions. In the corner regions stiffening structures of the first and second individual plate may be configured differently, for example with a different number and, for instance in the case of an orthogonal projection into a common plane parallel to the plate plane, are not congruent. For example, in such an orthogonal projection they may be arranged obliquely, such as also substantially at right-angles, to each other.

The perimeter sealing element may, in at least one of the individual plates, or in both individual plates, have a bead arrangement which protrudes out of a plate plane of the respective individual plate. The bead arrangement may be embodied as an embossed structure which is produced e.g. by means of deep drawing, embossing and/or hydroforming, for instance in the same step as the outer edge. The bead arrangement may have e.g. a bead roof and at least one bead flank adjoining the bead roof. For example, the bead arrangement has a bead roof, two bead flanks and, at least in portions, two bead feet. Alternatively, the bead arrangement may have a curved bead roof which merges directly into likewise-dished flanks which transition into bead feet. The perimeter sealing element in alternative embodiments may also have an elastomeric sealing element which protrudes out of a plate plane of the respective individual plate.

The individual plates may have in the electrochemically active region, but also in regions in which the media are fed to or discharged from the electrochemically active region essentially in parallel to the plate plane, further embossed structures which are produced e.g. by means of deep drawing, embossing and/or hydroforming. These further embossed structures may have structures for guiding media along the individual plate, such as a flow field and/or channel structures. The perimeter sealing element may surround the embossed structures, e.g. surround them in a closed loop. Often the perimeter sealing element runs around the flow field and seals it off from the surroundings of the individual plate.

Furthermore, with the present disclosure an electrochemical system is proposed which comprises a multiplicity of stacked bipolar plates of the type described previously, with electrochemical cells being formed between adjacent bipolar plates.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Examples of embodiment of the bipolar plate and the electrochemical system are illustrated in the appended figures and will be discussed in greater detail with reference to the following description.

FIG. 1 shows schematically a perspective representation of an electrochemical system with a multiplicity of individual plates or bipolar plates arranged in a stack;

FIG. 2 shows schematically a perspective representation of two bipolar plates of the system according to FIG. 1 with a membrane electrode assembly (MEA) arranged between the bipolar plates;

FIG. 3A shows schematically a section through a partial region of a plate stack according to one variation;

FIG. 3B shows schematically a section through a partial region of a plate stack according to a further variation;

FIG. 3C shows schematically a section through a partial region of a plate stack according to a further variation;

FIG. 8 shows schematically a perspective view of a partial region of a further bipolar plate with stiffening structures;

FIG. 9A shows schematically a top view of a partial region of a further bipolar plate with stiffening structures;

FIG. 9B shows schematically a section through the partial region of FIG. 9A along the line A-A;

FIG. 10A shows schematically a top view of a partial region of a further bipolar plate with stiffening structures;

FIG. 10B shows schematically a section through the partial region of FIG. 10A along the line B-B;

FIG. 11A shows schematically a top view of a partial region of a further bipolar plate with stiffening structures;

FIG. 11B shows schematically a section through the partial region of FIG. 11A along the line C-C;

FIG. 12 shows schematically a perspective view of a partial region of a further bi polar plate with stiffening structures;

FIG. 13 shows schematically a top view of a partial region of a further bipolar plate with stiffening structures;

FIGS. 1-16 are shown approximately to scale.

DETAILED DESCRIPTION

Figure 4A:
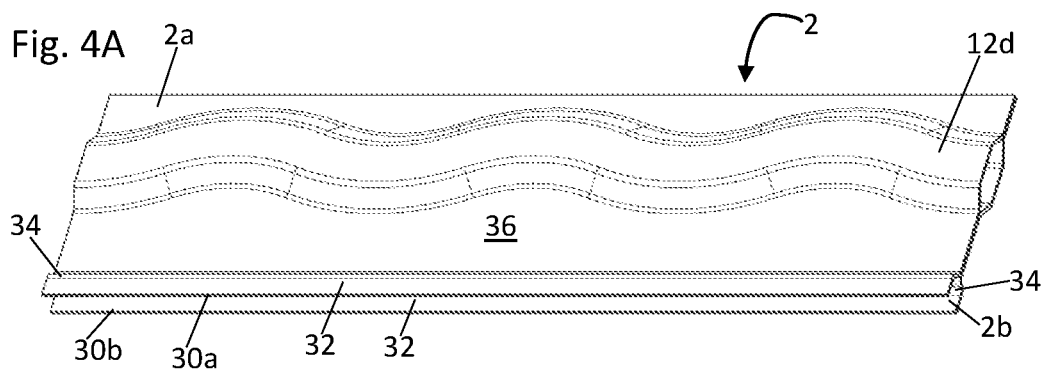
FIG. 4A shows schematically a perspective view of a partial region of a bipolar plate.

Here and in the following, features which recur in different figures are designated in each case by the same or similar reference numerals.

FIG. 1 shows an electrochemical system 1 with a plurality of identically constructed metallic bipolar plates 2 which are arranged in a stack 6 and are stacked along a z-direction 7. The bipolar plates 2 of the stack 6 are clamped between two end plates 3, 4. The z-direction 7 will also be referred to as the stacking direction. In the present example, the system 1 is a fuel cell stack. Each pair of adjacent bipolar plates 2 of the stack therefore enclose between them an electrochemical cell, which serves e.g. for converting chemical energy into electrical energy. To form the electrochemical cells of the system 1, in each case a membrane electrode assembly (MEA) is arranged between adjacent bipolar plates 2 of the stack (see e.g. FIG. 2). The MEAs typically contain in each case at least one membrane, e.g. an electrolyte membrane. Furthermore, a gas diffusion layer (GDL) may be arranged on one or both surfaces of the MEA.

In alternative embodiments, the system 1 may also be configured as an electrolyzer, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyzer, an electrochemical compressor or a redox flow battery may differ in each case from the media used for a fuel cell system.

The z-axis 7, together with an x-axis 8 and a y-axis 9, spans a right-handed Cartesian coordinate system. The bipolar plates 2 each define a plate plane, each of the plate planes of the separator plates being oriented parallel to the x-y plane and thus perpendicular to the stacking direction or to the z-axis 7. The end plate 4 has a plurality of media ports 5, via which media can be fed to the system 1 and via which media can be discharged from the system 1. These media which can be supplied to the system 1 and carried out of the system 1 may comprise e.g. fuels such as molecular hydrogen or methanol, reaction gases such as air or oxygen, reaction products such as water vapor or depleted fuels or coolants such as water and/or glycol.

FIG. 2 shows a perspective view of two adjacent bipolar plates 2 of an electrochemical system of the type of the system 1 of FIG. 1 and also a membrane electrode assembly (MEA) 10 arranged between these adjacent bipolar plates 2, the MEA 10 in FIG. 2 being for the most part hidden by the bipolar plate 2 facing the observer. The bipolar plate 2 is formed from two separator plates 2a, 2b bonded to each other (see e.g. FIGS. 3A-3C), of which in each case only the first separator plate 2a which hides the second separator plate 2b and faces the observer is visible in FIG. 2. The separator plates 2a, 2b may each be manufactured from a metal sheet, e.g. from a high-grade steel sheet. The separator plates 2a, 2b may be bonded, for example welded, soldered or bonded with an adhesive, such as bonded by laser-beam welded joints. Bipolar plates 2 which are adjacent to each other delimit one electrochemical cell in each case.

The separator plates 2a, 2b have through-openings which are flush with one another which form through-openings 11a-c of the bipolar plate 2. When a plurality of bipolar plates of the type of the bipolar plate 2 are stacked, the through-openings 11a-c form conduits which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack or discharged from the stack via the lines formed by the through-openings 11a. The conduits formed by the through-openings 11b, 11c on the other hand may be embodied to supply the electrochemical cells of the fuel cell stack 6 of the system 1 with fuel and with reaction gas and also to discharge the reaction products from the stack. The media-conducting through-openings 11a-11c are substantially formed parallel to the plate plane in each case. The through-openings, which are flush with each other, of the successive bipolar plates of a stack together form a conduit in the direction substantially perpendicularly to the plate plane.

To seal off the through-openings 11a-c from the interior of the stack 6 and from the surroundings, the first separator plates 2a each have sealing arrangements in the shape of sealing beads 12a-c, which in each case are arranged around the through-openings 11a-c and completely encompass the through-openings 11a-c in each case. The second separator plates 2b, on the rear side of the bipolar plates 2 which faces away from the observer of FIG. 2, have corresponding sealing beads for sealing off the through-openings 11a-c (not shown).

In an electrochemically active region 18, the first separator plates 2a have, on the front side thereof facing towards the viewer of FIG. 2, a flow field 17 with structures for guiding a reaction medium along the front side of the separator plate 2a. In FIG. 2, these structures are defined by a plurality of webs and channels extending between the webs and delimited by the webs. On the front side of the bipolar plates 2 facing towards the viewer of FIG. 2, the first separator plates 2a additionally have a distribution or collection region 20. The distribution or collection region 20 comprises structures which are configured to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures of the distribution or collection region 20 are likewise defined by webs and channels extending between the webs and delimited by the webs. Generally, the elements 17, 18, 20 can therefore be regarded as media-conducting embossed structures.

The sealing beads 12a-12c have passage openings 13a-13c, the passage openings 13a of which are realized both on the underside of the separator plate 2a which plate is on top and on the upper side of the separator plate 2b underneath, while the passage openings 13b are formed in the separator plate 2a which plate is on top and the passage openings 13c in the separator plate 2b underneath. For example, the passage openings 13a make it possible for coolant to pass between the through-opening 12a and the distribution region, so that the coolant arrives in the distribution region between the separator plates or is guided out therefrom. Furthermore, the passage openings 13b enable hydrogen to pass between the passage opening 13b and the distribution region on the upper side of the separator plate 2a which is on top: these passage openings 13b are characterized by perforations facing the distribution region and running obliquely to the plate plane. Thus, as an example hydrogen flows from the through-opening 11c through the passage openings 13b, to the distribution region on the upper side of the separator plate 2a which plate is on top, or in the opposite direction. The passage openings 13c enable for example air to pass between the through-opening 11c and the distribution region, so that air arrives in the distribution region on the under-side of the separator plate 2c underneath or is guided out therefrom. The associated perforations are not visible here.

The first separator plates 2a each further have a further sealing arrangement in the shape of a perimeter bead 12d which runs around the flow field 17 of the active region 18, the distribution or collection region 20 and the through-openings 11b, 11c and seals them off from the through-opening 11a, that is to say from the coolant circuit, and from the surroundings of the system 1. The second separator plates 2b each comprise corresponding perimeter beads. The structures of the active region 18, the distribution structures of the distribution or collection region 20 and the sealing beads 12a-d are each formed in one part with the separator plates 2a and formed into the separator plates 2a, e.g. in an embossing, deep drawing or hydroforming process. The same usually applies to the corresponding distribution structures and sealing beads of the second separator plates 2b. Outside the region surrounded by the perimeter bead 12d, an outer edge region 22 in which no channels are arranged is yielded in each separator plate 2a, 2b, which region may likewise comprise four corner regions 23 at the corners of the respective separator plate 2a, 2b.

The two through-openings 11b or the conduits through the plate stack of the system 1 formed by the through-openings 11b are each in a fluidic connection with each other via passage openings 13b in the sealing beads 12b, via the distribution structures of the distribution or collection region 20 and via the flow field 17 in the active region 18 of the first separator plates 2a facing the observer of FIG. 2. Analogously, the two through-openings 11c or the lines through the plate stack of the system 1 that are formed by the through-openings 11c are each fluidically connected to one another via corresponding bead passages, via corresponding distributing structures and via a corresponding flow field on an outer side of the second separator plates 2b facing away from the viewer of FIG. 2. In contrast, the through-openings 11a or the lines through the plate stack of the system 1 that are formed by the through-openings 11a are each fluidically connected to one another via a cavity 19 that is enclosed or surrounded by the separator plates 2a, 2b. This cavity 19 serves in each case for guiding a coolant through the bipolar plate 2, such as for cooling the electrochemically active region 18 of the bipolar plate 2.

FIGS. 3A, 3B, 3C show schematically a section through a portion of the plate stack 6 of the system 1 of FIG. 1, the section plane being oriented in the z direction and hence perpendicularly to the plate planes of the bipolar plates 2: It may for example run along the kinked section A-A in FIG. 2.

The identically constructed bipolar plates 2 of the stack each comprise the first metallic separator plate 2a previously described and the second metallic separator plate 2b previously described. There can be seen structures for conducting media along the outer faces of the bipolar plates 2, here for instance in each case in the form of lands and channels delimited by the lands. Channels 29 on those surfaces which point away from each other of adjoining separator plates 2a, 2b, and also cooling channels 19 between adjoining separator plates 2a, 2b are shown. Between the cooling channels 19 the two separator plates 2a, 2b lie on one another in a contact region 24 and are joined together there in each case, in the present example by means of laser-beam weld seams.

Between adjacent bipolar plates 2 of the stack there is arranged in each case a membrane electrode assembly (MEA) 10. The MEA 10 typically comprises in each case a membrane, e.g. an electrolyte membrane, and an edge portion 15 joined to the membrane. For example, the edge portion may be bonded to the membrane by a material-formed bond, e.g. using an adhesive or by laminating.

The membrane of the MEA 10 extends in each case at least over the active region 18 of the adjoining bipolar plates 2 and there makes a proton transfer possible via or through the membrane. The edge portion 15 of the MEA 10 serves in each case for positioning, fastening and sealing off the membrane between the adjoining bipolar plates 2. If the bipolar plates 2 of the system 1 are clamped in the stacking direction between the end plates 3, 4 (see FIG. 1), the edge portion 15 of the MEA 10 may for example in each case be pressed between the sealing beads 12a-d of the bipolar plates 2 which are adjoining in each case and/or in each case at least between the perimeter beads 12d of the adjoining bipolar plates 2, in order to fix the membrane 14 in this manner between the adjoining bipolar plates 2.

Each separator plate 2a, 2b has an outer edge 30a, 30b which laterally delimits the respective separator plate 2a, 2b and thus represents a delimitation for the outer edge region 22. The outer edge region 22 is furthermore as a rule delimited by the perimeter sealing element, for example the perimeter bead 12d. To the outside, the edge portion 15 of the MEA 10 can extend beyond the perimeter bead 12d and adjoin the individual plates 2a, 2b there in the outer edge region 22 and close off with its outer edges 30a, 30b (cf. FIG. 2) or protrude beyond the outer edge 30a, 30b.

As already described in conjunction with FIG. 2, both individual plates 2a, 2b each comprise a perimeter bead 12d, these beads being arranged opposite each other and forming embossed protrusions which protrude out of the plate plane in the z direction. The perimeter beads 12d as a rule each comprise a bead roof, two bead flanks adjoining the bead roof and two bead feet adjoining the bead flanks, the bead feet of the perimeter beads 12d of two adjacent individual plates 2a, 2b contacting one another and forming contact faces in this region. Alternatively, the respective perimeter bead 12d may have a curved bead roof which merges directly into likewise-dished flanks. In the stack 6, the perimeter beads 12d of adjacent bipolar plates 2, 2' are pressed together. In concrete terms, the bead roofs of adjacent bipolar plates 2, 2' in the stack 6 face each other, with typically at least a part of the MEA 10 being clamped between the bead roofs.

The bead shape of the perimeter sealing element 12d is however not absolutely necessary; instead of a bead shape, the perimeter sealing element may also be configured as an elastomeric sealing element.

FIGS. 3A, 3B and 3C further have in common that for each bipolar plate 2 in at least one of the individual plates 2a, 2b the outer edge 30a, 30b at least in regions protrudes out of a plate plane defined by the bipolar plate 2, 2'.

FIGS. 3A, 3B and 3C in principle show sections through a similar portion of the plate stack 6. The differences between FIGS. 3A, 3B and 3C are that they differ in the respective relative position of the outer edges 30a, 30b of the individual plates 2a, 2b.

In the following discussion of planes, in each case, the plate thickness will not be taken into account in the discussion for simplification. In an exemplary manner, in this case therefore both individual plates 2a, 2b lie in the plate plane E of the bipolar plate 2. If in considering these planes an outer edge 30a, 30b is considered, in a sectional view consequently a point on the outer edge is meant, not the cut outer edge face, for example a line which would—when taking into account the sheet thickness—does run substantially perpendicularly to the plate plane E.

Thus it can be seen in FIG. 3A that with each bipolar plate 2 both outer edges 30a, 30b, respectively, protrude out of the plate plane E of the bipolar plate 2. In the example of FIG. 3A, the outer edges 30a, 30b are spaced apart from one another and gape or spread apart. In other words, the outer edges 30a, 30b point away from each other and face away from each other. A perspective view of a partial region of a bipolar plate 2 installed in the stack 6 of FIG. 3A is shown in FIG. 4A.

Figure 4B:
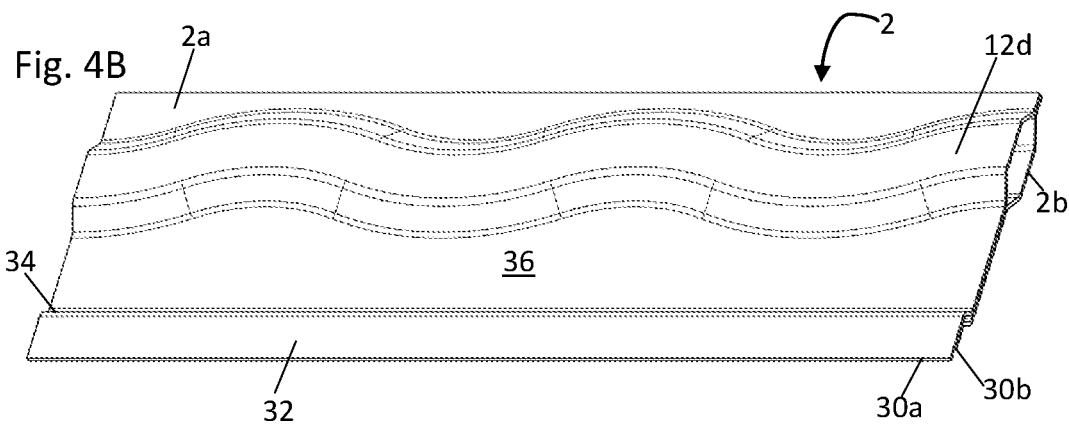
FIG. 4B shows schematically a perspective view of a partial region of a further bipolar plate.

The outer edges 30a, 30b of each bipolar plate 2 of FIG. 3B likewise both protrude out of the plate plane E of the bipolar plate 2. However, both outer edges 30a, 30b are offset in the same direction and have substantially the same offset in the stacking direction (for example perpendicularly to the plate plane E in the z-direction). The outer edge 30b thus faces the outer edge 30a. In one possible configuration, the outer edge 30b in this discussion without taking thickness into account is congruent with the outer edge 30a at least in portions. Advantageously, the two outer edges 30a, 30b in an orthogonal projection into a common plane perpendicularly to the plate plane E are however offset relative to each other: the distance may in this case be substantially constant or change along the course of the outer edges. A perspective view of a partial region of a bipolar plate 2 installed in the stack 6 of FIG. 3B is shown in FIG. 4B.

Figure 4C:
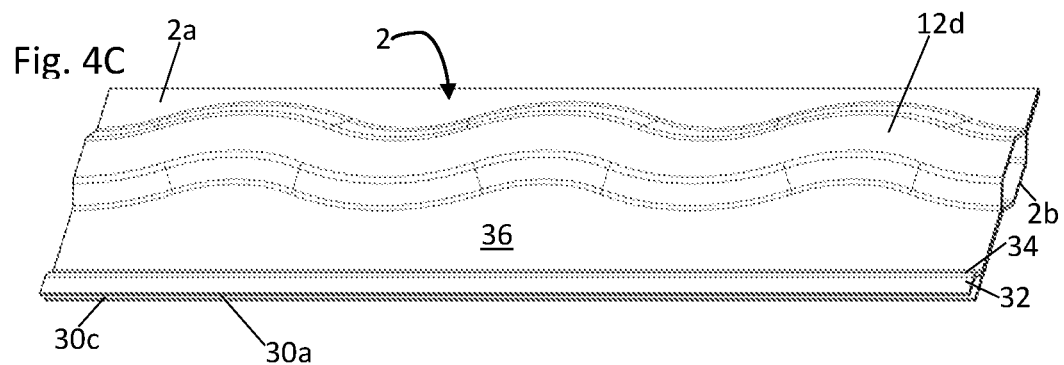
FIG. 4C shows schematically a perspective view of a partial region of a further bipolar plate.

It can be seen in FIG. 3C that merely one single outer edge, namely the outer edge 30a of the first individual plate 2a, protrudes out of the plate plane E of the bipolar plate 2. The outer edge 30c of the second individual plate 2b however lies in the plate plane E of the bipolar plate 2. A perspective view of a partial region of a bipolar plate 2 installed in the stack 6 of FIG. 3C is shown in FIG. 4C.

It can furthermore be seen from FIGS. 3A, 3B, 3C and 4A, 4B, 4C that a cross-section of the outer edge region 22 typically has a plateau portion 32 embodied substantially flat which adjoins the respective outer edge 30a, 30b. The plateau portion 32 extends usually parallel to the x-y plane and hence also parallel to the plate plane E of the bipolar plate 2. Further, the cross-section of the outer edge region 22 may have a flank 34 or dished portion which rises at an angle out of the plate plane E and which merges on one side into the plateau portion 32 and on the other side merges into a contact region 36. The contact region 36 is usually oriented parallel to the plate plane E of the bipolar plate 2: More precisely, it runs in the plate plane E of the bipolar plate 2 and adjoins the perimeter sealing element 12d. The contact region 36 may also be regarded as part of the outer edge region 22.

The individual plates 2a, 2b rest flat against each other in the contact region 36 between the perimeter sealing element 12d and the flank 34 and contact each other at least in regions. The outer edge region 22 of the individual plates 2a, 2b therefore comprises, in succession, the respective outer edge 30a, 30b, the plateau portion 32, the flank 34 and the contact region 36. In the contact region 36, the individual plates 2a, 2b may be bonded, e.g. by means of welded or soldered joints or an adhesive.

The outer edge region 22, or at least parts thereof, such as the flank 34, has embossed structures which may be formed in the respective individual plate 2a, 2b for example by means of hydroforming, embossing and/or deep drawing. The contact region 36 of the outer edge region 22 as a rule is a region in which no structures for fluid guidance are provided.

In order to reinforce the outer edge region 22, according to the present disclosure a multiplicity of stiffening structures 40 are provided, which are shown in FIGS. 5-16 and will be discussed in greater detail with reference to the following description. The stiffening structures 40 may be configured to locally reduce a bending ability of the respective individual plate, in order thus to increase the stiffness. Those regions of the outer edge region 22 in which no stiffening structures 40 are provided may correspond to those of FIGS. 3A, 3B and 3C with respect to their cross-sections.

Figure 5:
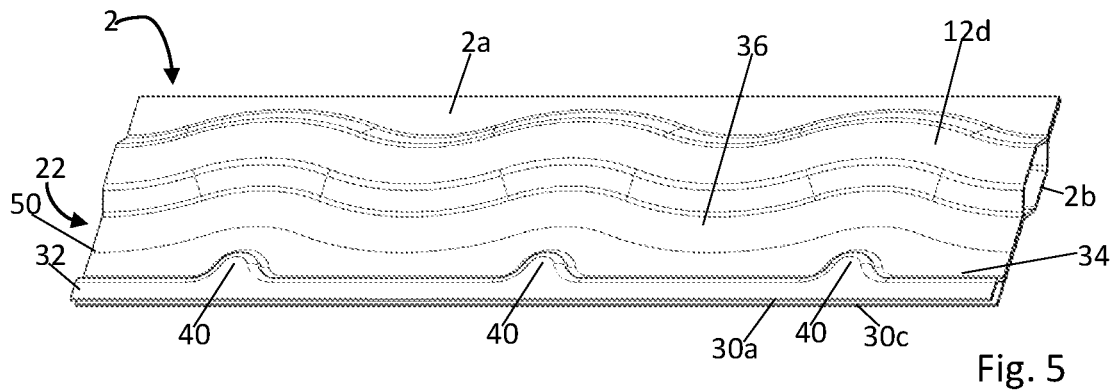
FIG. 5 shows schematically a perspective view of a partial region of a bipolar plate with stiffening structures.
Figure 6:
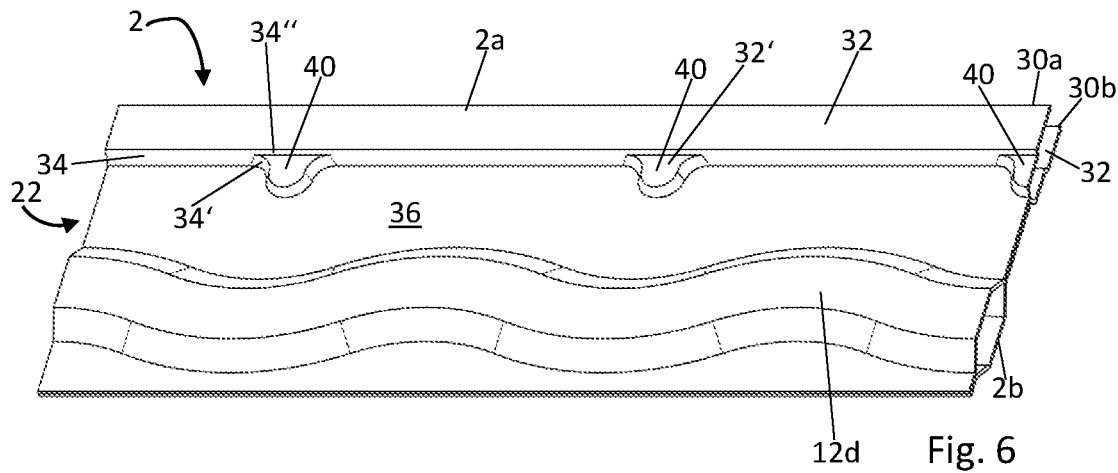
FIG. 6 shows schematically a perspective view of a partial region of a further bipolar plate with stiffening structures.

Thus, the bipolar plates 2 shown in FIGS. 5 and 6 differ from the bipolar plates 2 shown in FIGS. 4A, 4B and 4C in that additional stiffening structures 40 are provided in order to reinforce the outer edge region 22 and to stiffen the outer edges 30a, 30b. The stiffening structures 40 may be provided in those individual plates 2a, 2b which have the outer edges 30a, 30b which protrude out of the plate plane E. The stiffening structures 40 are usually arranged between the outer edge 30a, 30b and the perimeter sealing element 12d. Apart from the stiffening structures 40, the bipolar plates 2 of FIGS. 5 and 6 correspond substantially to the bipolar plates 2 of FIG. 4C or 4A, respectively.

Corresponding to the outer edges 30a, 30b which gape or spread apart, the stiffening structures 40 of FIG. 6 of the individual plates 2a, 2b also face away from each other. In the embodiment of FIG. 6, opposing stiffening structures 40 of the individual plates 2a, 2b are of the same shape and the same size. Alternatively, they may also be of different shapes and/or different sizes.

In the embodiment of FIG. 5, the stiffening structure 40 has a height, measured from the plate plane E of the bipolar plate 2, which is just as high as a height of the associated outer edge 30a, 30c. Where the stiffening structures 40 are arranged, the plateau portion 32 has a greater extent measured perpendicularly to the outer edge 30a, 30b. The region of the plateau portion 32 which lies between the stiffening structures 40 is substantially rectangular in the examples of FIGS. 5, 6 and 8-16. A course of this region which faces the perimeter sealing element 12d is therefore straight and parallel to the respective outer edge 30a, 30b or 30c. The stiffening structures begin here along the course of the outer edge; for example in each case at the point at which the transition from the contact region 36 to the flank 34 no longer runs parallel to the outer edge 30a, 30b, 30c, or they end with the asymptotic transition into a line parallel to the outer edge 30a, 30b, 30c.

The bipolar plate 2 of FIG. 6 has two outer edges 30a, 30b which gape or spread apart which are directed towards each other. The height of the stiffening structures 40 in the example of embodiment of FIG. 6 is less than the height of the associated outer edge 30a, 30b. As a result, a further plateau portion 32' is yielded in addition to the plateau portion 32 in the immediate vicinity of the outer edge 30a, 30b in each stiffening structure 40. The flank 34 runs parallel to the outer edge 30a, 30b, but divides in the region of the stiffening structure 40 into a flank 34' protruding or bulging in the direction of the perimeter sealing element and a flank 34" which continues the flank 34 but is significantly shorter in its vertical extent. The individual plates 2a, 2b of the bipolar plate 2 of FIG. 6 may be configured mirror-symmetrically to the contact plane and/or to the plate plane E of the bipolar plate 2.

In the case of arrangements with outer edges which point away from each other as in FIG. 6, the height of the stiffening structure 40, the height of the outer edge 30a, 30b, or the height of the plateau portion 32 is less than or at most as great as a height of the perimeter sealing element 12d, see FIGS. 5-16.

The stiffening structures 40 of FIGS. 5-16 may be formed integrally with the individual plates 2a, 2b and as a rule are configured as embossed structures. The stiffening structures 40 may be formed in the respective individual plate 2a, 2b for example by means of hydroforming, embossing and/or deep drawing. The stiffening structures 40 of FIGS. 5, 6, 8-12 and 14-16 comprise for example protrusions which point away from the outer edge 30a, 30b or 30c and point in the direction of the perimeter sealing element 12d. Alternatively or additionally, the stiffening structures 40 may have indentations which point in the direction of the outer edge 30a, 30b or 30c and point away from the perimeter sealing element 12d, see FIGS. 7, 13 and 14. The flank 34, 34', 34" or dished portion may be at a different distance from the outer edge 30a, 30b in the region of the stiffening structures 40 than the flank 34 in an adjoining region without stiffening structures. If the stiffening structures 40 are configured for example as protrusions, the flank/dished portion 34, 34', 34" may be at a greater distance from the outer edge 30a, 30b, 30c in the region of the protrusions. If the stiffening structures 40 are configured as indentations, the flank/dished portion 34, 34', 34" may be at a shorter distance from the outer edge 30a, 30b, 30c. In other words, the size and shape of the plateau portion 32, 32' may locally depend on the presence of the stiffening structures 40 and also the size and shape of the stiffening structures 40.

As a rule, the stiffening structures 40 of the respective individual plate 2a, 2b, at least in portions, are arranged periodically along the outer edge 30a, 30b, 30c, so that adjacent stiffening structures 40 of the respective individual plate 2a, 2b in the portion in question are at the same distance from each other.

In the embodiments of FIGS. 5 and 8-12, additionally a connection 50 by bonding is shown which joins the individual plates 2a, 2b, such as in the form of a weld seam 50 or laser-beam weld seam. Although the connection, such as a weld seam 50, is not shown in all the figures, such a connection can generally be used to join the individual plates 2a, 2b. The welded connection 50 may comprise at least one continuous weld seam. Alternatively, the welded connection may also have at least two welded portions 51, 52 which comprise overlapping ends for forming a weld seam, see FIG. 12. Further, provision may be made for the welded connection 50 to have a multiplicity of separate welded portions, such as ones which are spaced apart from each other. For example, the welded connection has a stitched seam which comprises linear or arcuate welded portions which are formed in a row, for instance spaced apart from each other. In order to achieve a tight connection of the individual plates 2a, 2b, a continuous weld seam or a weld seam with overlapping ends may be used.

As shown in FIGS. 2, 4A, 4B, 4C and 5-16, the perimeter sealing element 12d of the respective individual plate 2a, 2b may at least in portions have a periodic course. An undulating course may be considered for the periodic course. The periodic or undulating course of the perimeter sealing element 12d may have at least two wave periods with convex and concave portions which merge into each other at an inflection point. The stiffening structures 40 may for example each face and be located opposite the concave portions of the perimeter sealing element 12d (see FIGS. 5-12, 15 and 16), or face the convex portions of the perimeter sealing element 12d (see FIG. 13), or face both the convex portions and the concave portions of the perimeter sealing element 12d (see FIG. 14).

In principle, the stiffening structures 40 may however also be arranged at other positions in relation to a periodic course of the perimeter sealing element 12d, for example at the inflection points. It is likewise not ruled out for the period of the course of the perimeter sealing element 12d to be a different one from that of the arrangement of the stiffening structures 40.

Figure 7:
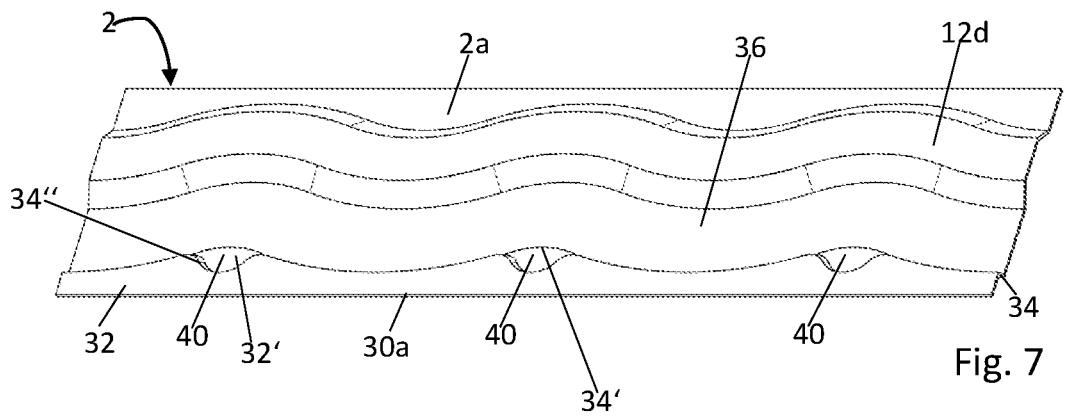
FIG. 7 shows schematically a perspective view of a partial region of an individual plate with stiffening structures.

FIG. 7 shows a perspective view of an individual layer 2a which can be used instead of the first layer 2a in FIG. 5 or 6. A flank 34, 34' located opposite the outer edge 30a may have a periodic course, its period and the period of the perimeter sealing element 12d may be the same. In the embodiment of FIG. 7, the stiffening structures 40 are embodied as indentations which are directed towards the outer edge 30a. In FIG. 7 too, the stiffening structures 40 at least in portions are arranged periodically along the outer edge 30a. The flank 34 of the plateau portion 32 which lies between the stiffening structures 40 and which faces the perimeter sealing element 12d has for example an arcuate course which is not parallel to the respective outer edge 30a, 30b.

The bipolar plate 2 shown in FIG. 8 has the basic form of the bipolar plate 2 illustrated in FIG. 4B. Furthermore, stiffening structures 40 and an optional continuous weld seam 50 are provided in FIG. 8. Different from FIG. 5 and in a similar manner as in FIG. 6, the height of the stiffening structures 40 of FIG. 8 is less than the height of the outer edge 30a and the height of the plateau portion 32.

Since the outer edges 30a, 30b and the plateau portions 32 of the individual plates 2a, 2b of the bipolar plate 2 of FIG. 8 are offset in the same direction, the stiffening structures 40 of the individual plate 2b face the stiffening structures 40 of the individual plate 2a and furthermore engage in the stiffening structures 40 of the individual plate 2a. The stiffening structures 40 of the individual plate 2a are thus configured to receive the stiffening structures 40 of the individual plate 2b. For this reason, the stiffening structures 40 of the individual plate 2a may be formed differently from and/or larger than the stiffening structures 40 of the individual plate 2b.

A configuration similar to the bipolar plate 2 of FIG. 8 is shown in FIG. 9A, which illustrates a top view of a bipolar plate 2. Broken lines here indicate the position and features of the individual plate 2b hidden by the individual plate 2a. It can be seen here in addition to the elements already previously described such as perimeter sealing element 12d, outer edge 30a, plateau portion 32, weld seam 50, such as that the stiffening structure 40 of the individual plate 2a receives the stiffening structure 40 of the individual plate 2b. In the present example, in which the outer edges 30a, 30b relative to the plate plane E of the bipolar plate 2 point in the same direction, the stiffening structures 40 of the individual plate 2b in a plane parallel to the plate plane E lie in portions against the stiffening structures 40 of the individual plate 2a. One difference from FIG. 8 is that the stiffening structures 40 of the individual plates 2a, 2b have the same height $H_{40}$ as the associated outer edges 30a, 30b and the adjoining plateau portions 32, $H_{30}$. This can be seen clearly in the sectional drawing of FIG. 9B, which shows a view of a section along the line A-A of FIG. 9A.

The bipolar plate 2 shown in FIGS. 10A, 10B is very similar to the bipolar plate 2 of FIGS. 9A and 9B; the sole difference between the two bipolar plates 2 is that the height $H_{40}$ of the stiffening structures 40 of the individual plate 2b is less than the height Hao of the associated outer edge 30b, whereas the height of the stiffening structures 40 of the individual plate 2a and the height of the associated outer edge 30a are the same. In the individual plate 2b, another plateau portion 32' is therefore yielded in the section plane illustrated in addition to the plateau portion 32. This plateau portion of the stiffening structures 40 of the individual plate 2b is thus arranged heightwise between the plateau portion 32 and the contact region 36. As in FIG. 6, the flank 34 divides in the region of the stiffening structures 40 into a flank 34' which runs around the stiffening structure in the direction of the perimeter bead 12d and a flank 34" which continues the flank 34 substantially parallel to the outer edge 30b.

A further embodiment of the bipolar plate 2 is shown in FIGS. 11A and 11B. Here, the plateau portion 32' of the stiffening structure 40 of the individual plate 2a has a greater height than the outer edge 30a and the adjoining plateau portion 32. The height $H_{40}$ of the stiffening structure 40 of the individual plate 2a may be at most as great as the height $H_{12}$ of the perimeter sealing element 12d. In an arrangement with outer edges 30a, 30b pointing in the same direction relative to the plate plane E of the bipolar plate, as shown in FIGS. 11A and 11B, the maximum height of the stiffening structures $H_{40}$ and/or the maximum height $H_{30}$ of the outer edge may at most be as large as an overall height of the perimeter sealing elements of the two individual plates of the bipolar plate, for example twice $H_{12}$ in the case of perimeter sealing elements of the same height. The flank 34" here is inclined inversely to the flank 34'.

Whereas the stiffening structures 40 of FIG. 8 are arranged periodically along the outer edges 30a, 30b with a period which corresponds to a period of the undulating perimeter bead 12d, a period of the stiffening structures 40 of the embodiment of FIG. 12 amounts to merely half the period of the undulating perimeter bead 12d. In order to stabilize the region which faces the concave portion of the perimeter bead 12d and in which no stiffening structure is arranged, the weld seam 50 comprises two partial portions 51, 52, which cross at a crossing point 53, with end portions of the partial portions 51, 52 reaching up to the flank 34. Provision may be made for the end portions of the partial portions 51, 52 to have a minimum distance from the outer edge 30a which is less than a minimum distance from the weld seam 50 to the stiffening structure 40. While it is in principle possible to provide alternating formed-in stiffening structures 40 and intersecting weld seams, so that in the entire arrangement the stiffening structure has double the period of the perimeter sealing element 12d, FIG. 12 may also illustrate only a detail of an arrangement in which stiffening structures 40 formed on both sides into the individual plates adjoin with the same period as that of the perimeter sealing element 12d and the periodic course is interrupted again by a crossing point 53 of welds after some, for example between five and 20, periods.

The bipolar plate 2 shown in FIG. 13 provides for the stiffening structures 40 in each case to be arranged located opposite the convex portions of the perimeter sealing element 12d. The stiffening structures 40 of FIG. 13 may in such case for reasons of space be configured as indentations which face the outer edges 30a, 30b and face away from the perimeter bead 12d.

Figure 14:
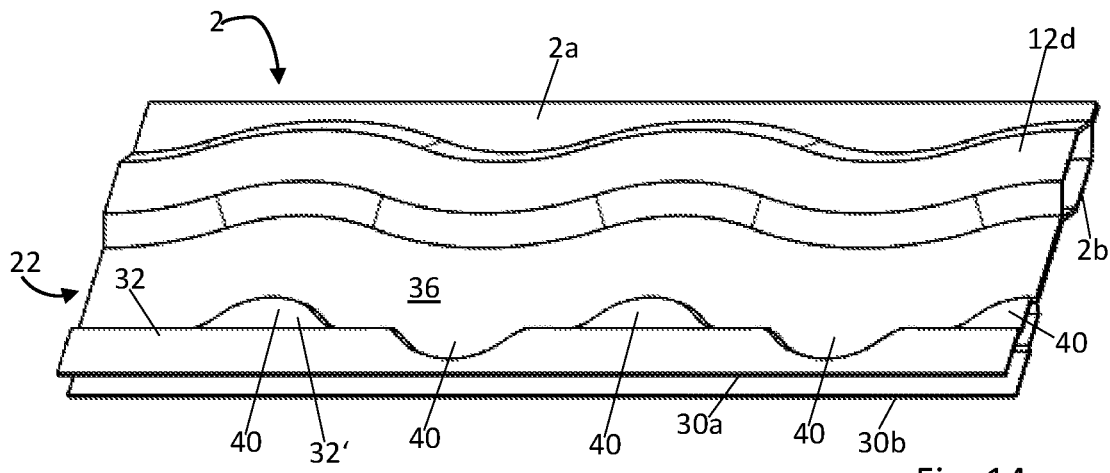
FIG. 14 shows schematically a perspective view of a partial region of a further bipolar plate with stiffening structures.

The bipolar plate 2 of FIG. 14 corresponds substantially to the bipolar plate 2 of FIG. 6, with the stiffening structures 40 in addition to the protrusions 40 also comprising indentations 40 which for example are arranged located opposite the convex portions of the perimeter sealing element 12d. Typically, the stiffening structures 40 configured as indentations face the outer edges 30a, 30b and face away from the perimeter bead 12d.

Figure 15:
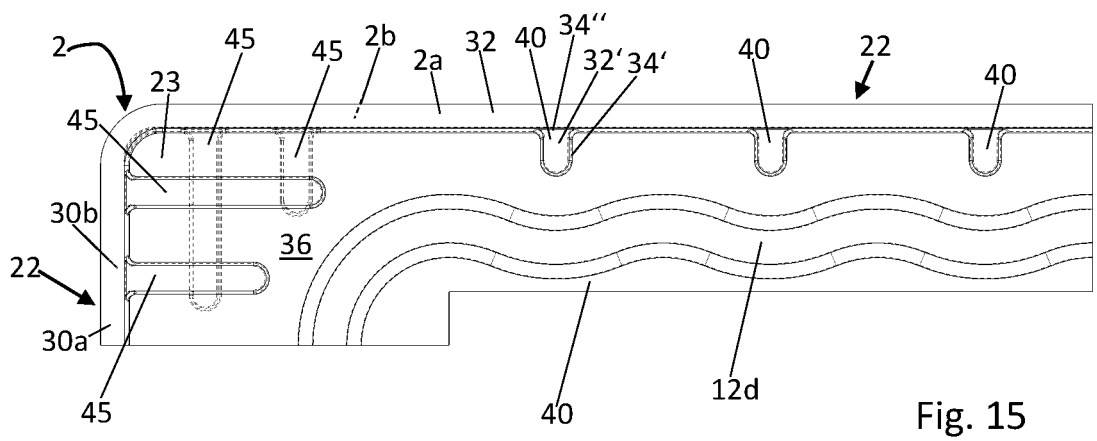
FIG. 15 shows schematically a partially transparent top view/phantom view of a partial region of a further bipolar plate with stiffening structures.

The configuration of the bipolar plate 2 of FIG. 15 corresponds substantially to the bipolar plate 2 of FIG. 8, with the rear side of the bipolar plate 2 of FIG. 8 and also additionally a corner region 23 of the bipolar plate 2 being shown in FIG. 15. Furthermore, the weld seam 50 has not been represented in FIG. 15; nevertheless, the weld seam may also be provided in the bipolar plate 2 of FIG. 15.

In addition to the stiffening structures 40, the bipolar plate 2 of FIG. 15 has at least one further stiffening structure 45 which is arranged in the corner region 23 of the bipolar plate 2. In the example of embodiment shown, by way of example two stiffening structures 45 are provided in each individual plate 2a, 2b; a larger number of stiffening structures 45 in the corner region is however also conceivable. The stiffening structures 45 may be constructed in a similar way to the stiffening structures 40 described above. Since however as a rule more space is present in the corner region 23 of the bipolar plate 2 than on the side regions of the bipolar plate 2, the stiffening structures 45 may have a greater lateral extent perpendicularly to the associated outer edge 30a, 30b than the stiffening structures 40. Here, the stiffening structures 45 of the first and second individual plate 2a, 2b are configured such that they are not congruent in an orthogonal projection into a common plane parallel to the plate plane E. In the example of FIG. 15, they are arranged substantially at right-angles to each other and overlap each other only in portions. They could however also be arranged obliquely to each other in another manner.

Figure 16:
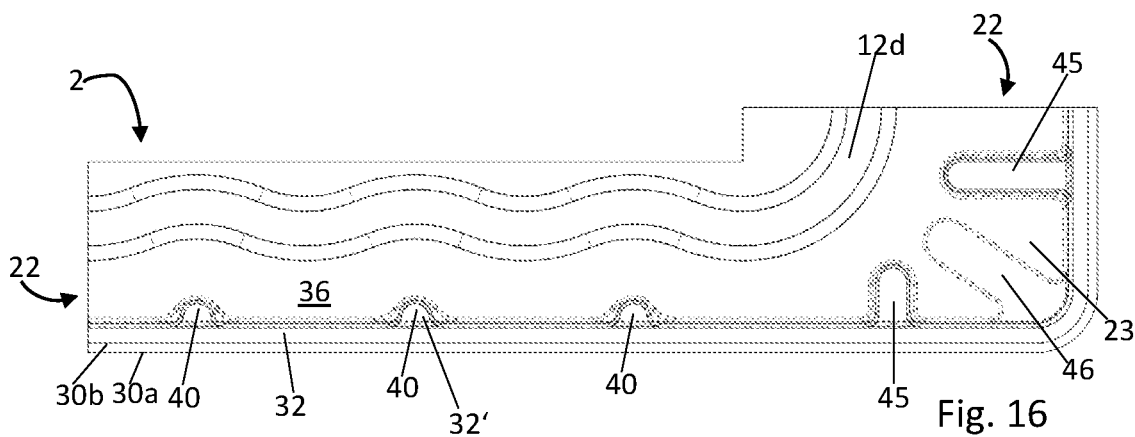
FIG. 16 shows schematically a partially transparent top view/phantom view of a partial region of a further bipolar plate with stiffening structures.

FIG. 16 shows a further bipolar plate 2 which is similar to the bipolar plate of FIG. 15. It can be recognized that an obliquely extending stiffening structure 46 is present in the individual plate 2a, with a corresponding stiffening structure 45 being absent from the individual plate 2b.

It should further be mentioned that the number of stiffening structures 40 in the two plates 2a, 2b may be the same and that each stiffening structure 40 of the first individual plate 2a can be associated with a stiffening structure 40 of the second individual plate 2b, which as a rule is arranged located opposite in the stacking direction, for example perpendicularly to the plate plane E, or directly adjoining. In alternative embodiments, the individual plates 2a, 2b each have a different number of stiffening structures 40.

The features described above of the stiffening structures 40, 45 may be combined with one another as long as they do not conflict. Provision may also be made for a single bipolar plate 2 to have at least two partial portions of the bipolar plates shown in FIGS. 5-16.

FIGS. 1-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE NUMERALS

1 electrochemical system
2 bipolar plate
2' bipolar plate
2a individual plate
2b individual plate
3 end plate
4 end plate
5 media port
6 stack
7 z-direction
8 x-direction
9 y-direction
10 membrane electrode assembly
11a-c through-openings
12a-d sealing beads
13a-c passage openings
14 membrane
15 edge portion
17 flow field
18 electrochemically active region
19 cavity
20 distribution and collection region
22 outer edge region
23 corner region
24 contact region
29 channel
30a outer edge
30b outer edge
32 plateau portion
32' plateau portion of the stiffening structure if plateau portion offset
34 flank
34', 34" possibly branching flanks in the region of the stiffening structure
36 contact region
40 stiffening structure
45 stiffening structure
46 stiffening structure
50 weld seam
E plate plane of the bipolar plate
$H_x$ height of the element x in question

The invention claimed is:

1. A bipolar plate for an electrochemical system, the bipolar plate comprising a first individual plate and a second individual plate which are joined together, each individual plate comprising:
   an electrochemically active region,
   an outer edge which laterally delimits the respective individual plate,
   a perimeter sealing element, surrounding the electrochemically active region and running at least in regions along the outer edge, for sealing off the electrochemically active region, and
   an outer edge region spans between the edge of the perimeter sealing element facing the outer edge and the outer edge,
   wherein in at least one of the individual plates, the outer edge protrudes out of a plate plane defined by the bipolar plate, at least in regions, wherein at least one of the individual plates has a plurality of stiffening structures in order to stiffen the outer edge region of the bipolar plate, wherein each of the plurality of stiffening structures is an embossed structure, a hydroformed structure, or a deep drawn structure, and wherein the outer edge protruding out of the plate plane forms a plateau portion parallel to the plate plane in the outer edge region, wherein the plateau portion extends from the outer edge to a flank, and wherein a first end of each of the stiffening structures is joined to the flank and a second end of each of the stiffening structures is arranged between the flank and the perimeter sealing element of the respective individual plate, the second end opposite to the first end, such that the stiffening structures are arranged between the plateau portion and the perimeter sealing element.

2. The bipolar plate according to claim 1, wherein the plurality of stiffening structures are adjacent to one another along a lateral section of the outer edge of the respective individual plate.

3. The bipolar plate according to claim 1, wherein the outer edge regions of the individual plates lie flat against one another and contact one another, at least in portions.

4. The bipolar plate according to claim 3, wherein the individual plates are joined together in the outer edge regions by bonding.

5. The bipolar plate according to claim 1, wherein the outer edges of the individual plates spread outward to be spaced apart from one another.

6. The bipolar plate according to claim 5, wherein stiffening structures of the first plate face away from respective stiffening structures of the second plate.

7. The bipolar plate according to claim 6, wherein the stiffening structures which face away from each other have different shapes.

8. The bipolar plate according to claim 1, wherein the outer edges of the individual plates are offset in the same direction with respect to the plate plane of the bipolar plate.

9. The bipolar plate according to claim 8, wherein stiffening structures of the first plate face respective stiffening structures of the second plate.

10. The bipolar plate according to claim 9, wherein the stiffening structures of the first individual plate facing the stiffening structures of the second plate and the corresponding stiffening structures of the second individual plate are differently shaped.

11. The bipolar plate according to claim 1, wherein the stiffening structures comprise protrusions which point away from the outer edge and/or point in the direction of the perimeter sealing element.

12. The bipolar plate according to claim 1, wherein the stiffening structures each have a height, measured from the plate plane of the bipolar plate, which is less or greater than a height of the outer edge.

13. The bipolar plate according to claim 12, wherein the height of the stiffening structures and/or the height of the outer edge is/are at most as great as a height of the perimeter sealing element.

14. The bipolar plate according to claim 1, wherein the stiffening structures of the respective individual plate, at least in portions, are arranged periodically along the outer edge, such that adjacent stiffening structures of the respective individual plate in the portion in question are at the same distance from each other.

15. The bipolar plate according to claim 1, wherein the perimeter sealing element of the respective individual plate has a periodic course, at least in portions.

16. The bipolar plate according to claim 15, wherein the periodic course has at least two wave periods with convex and concave portions which merge into one another at an inflection point, and each of the stiffening structures faces the concave portions of the perimeter sealing element.

17. The bipolar plate according to claim 1, wherein the individual plates each comprise at least one corner region, wherein at least one further stiffening structure is provided in the corner region of at least one individual plate.

18. The bipolar plate according to claim 1, wherein each stiffening structure of the first individual plate is associated with one of the stiffening structures of the second individual plate.

19. The bipolar plate according to claim 1, wherein a height of the stiffening structures from the plate plane is less than a height of the outer edge.

20. An electrochemical system, comprising a plurality of stacked bipolar plates according claim 1, wherein electrochemical cells are formed between adjacent bipolar plates.

* * * * *